(12) United States Patent
Harnay et al.

(10) Patent No.: US 9,439,224 B2
(45) Date of Patent: Sep. 6, 2016

(54) INCREASED THROUGHPUT IN RADIO-FREQUENCY COMMUNICATIONS

(75) Inventors: Didier Harnay, Cesson Sevigne (FR); Stephane Pineau, Chateaugiron (FR); Samuel Rousselin, Rennes (FR)

(73) Assignee: ST-ERICSSON SA, Plan-les-Ouates (CH)

( * ) Notice: Subject to any disclaimer, the term of this patent is extended or adjusted under 35 U.S.C. 154(b) by 463 days.

(21) Appl. No.: 13/322,413

(22) PCT Filed: May 27, 2010

(86) PCT No.: PCT/EP2010/057352
§ 371 (c)(1),
(2), (4) Date: Nov. 23, 2011

(87) PCT Pub. No.: WO2010/136541
PCT Pub. Date: Dec. 2, 2010

(65) Prior Publication Data
US 2012/0082143 A1    Apr. 5, 2012

(30) Foreign Application Priority Data
May 29, 2009 (FR) ...................................... 0953590

(51) Int. Cl.
*H04W 74/08* (2009.01)

(52) U.S. Cl.
CPC ................................ *H04W 74/0841* (2013.01)

(58) Field of Classification Search
None
See application file for complete search history.

(56) References Cited

U.S. PATENT DOCUMENTS 6,072,792 A * 6/2000 Mazur et al. ................. 370/345
6,707,807 B1 * 3/2004 Menzel ......................... 370/337

(Continued)

FOREIGN PATENT DOCUMENTS

EP    1850533 A1    10/2007
WO    03077589 A1    9/2003

OTHER PUBLICATIONS

Patent Cooperation Treaty International Search Report and Written Opinion of PCT/EP2010/057352; Jan Fribert; Jul. 16, 2010; 7 pages.

(Continued)

*Primary Examiner* — Chirag Shah
*Assistant Examiner* — Rina Pancholi
(74) *Attorney, Agent, or Firm* — Howiosn & Arnott, LLP

(57) ABSTRACT

A mobile telephony radiocommunication management process, with first time slots and second time slots being provided independently of each other, said process comprising the default selection of first time slots for transmitting/receiving first bursts corresponding to these first time slots, and in the case of a first time slot at least partially overlapping with a second time slot, choosing the first time slot or the second time slot, for respectively transmitting/receiving the first burst corresponding to the first time slot or receiving the second burst corresponding to the second time slot, with this choice being made so as to minimize the number of second bursts received for a given result.

8 Claims, 4 Drawing Sheets

(56) References Cited

U.S. PATENT DOCUMENTS

| | | | |
|---|---|---|---|
| 7,133,421 B1* | 11/2006 | Puhakainen et al. | 370/498 |
| 7,420,918 B2* | 9/2008 | Farahmand et al. | 370/235 |
| 2005/0111430 A1 | 5/2005 | Spear et al. | |
| 2005/0190770 A1* | 9/2005 | Saniee et al. | 370/395.4 |
| 2007/0253364 A1* | 11/2007 | Wandel | H04L 12/66 370/329 |
| 2008/0253311 A1* | 10/2008 | Jin | 370/311 |
| 2010/0142417 A1* | 6/2010 | Kim et al. | 370/281 |
| 2010/0157958 A1* | 6/2010 | Wong et al. | 370/337 |

OTHER PUBLICATIONS

Institut National De La Propriete Industrielle; Rapport de Recherche Preliminaire; French Search Report and Written Opinion; Jan Fribert; Feb. 11, 2010; 6 pages.

* cited by examiner

INCREASED THROUGHPUT IN RADIO-FREQUENCY COMMUNICATIONS

CROSS-REFERENCE TO RELATED APPLICATIONS

This application is a U.S. National Phase application submitted under 35 U.S.C. §371 of Patent Cooperation Treaty application serial no. PCT/EP2010-057352, filed May 27, 2010, and entitled INCREASED THROUGHPUT IN RADIO-FREQUENCY COMMUNICATIONS, which application claims priority to French patent application serial no. FR 0953590, filed May 29, 2009, and entitled INCREASED THROUGHPUT IN RADIO-FREQUENCY COMMUNICATIONS.

Patent Cooperation Treaty application serial no. PCT/EP2010/057352, published as WO 2010/136541, and French patent application serial no. FR 0953590, are incorporated herein by reference.

TECHNICAL FIELD

The present invention relates to the field of mobile telephony, in particular the field of Time Division Multiple Access (TDMA) mobile telephony.

The invention has applications in telephony systems such as GSM (Global System for Mobile communications), GPRS (General Packet Radio Service), 3GPP (3rd Generation Partnership Project), and other systems.

BACKGROUND

A TDMA mobile station transmits and receives data in blocks, with each block corresponding to a logical channel. A block of data is divided into four frames. Each frame is partitioned into eight intervals of time (slots). Of these eight time slots, some are allocated for the transmitting/receiving of a block element (a burst).

A mobile station transmits/receives packet data on packet channels, for example PDTCH (Packet Data Traffic Channel). Time slots are therefore set aside for the transmitting/receiving of packet data.

However, the mobile station is also likely to receive supplemental data during time slots not aligned with the allocated time slots provided for this purpose.

For example, the mobile station receives information concerning a neighbor cell, for example parameters for accessing this neighbor cell, a Location Area Code for the neighbor cell, etc. Such information allows, for example, connecting to the most favorable base station. This information is received on a logical control channel, for example the BCCH channel (Broadcast Control Channel).

There is also the data received on a paging channel, for example a PCH channel (Paging Channel).

When such additional data is received during time slots which overlap the time slots allocated for transmitting/receiving packet data, the mobile station stops transmitting/receiving the packet data for the entire duration of the packet data blocks corresponding to the overlapping slots.

Because of the non-alignment, a block of these additional data, for example a BCCH block, generally overlaps two packet data blocks, for example two PDTCH blocks. Therefore two packet data blocks may be lost when an unaligned block is received.

In addition, a BCCH time slot may cover two neighboring PDTCH allocated time slots corresponding to two respective PDTCH blocks. In this case four PDTCH blocks are lost for one block of additional data received.

Retransmission of these blocks is then required.

SUMMARY

There is a need for a device and a process for improving the throughput of packet data.

The invention embodiments propose a mobile telephony radiocommunication management device, with first time slots being provided for transmitting/receiving respective first bursts, and second time slots being provided independently of the first time slots, for receiving respective second bursts. The first time slots are grouped into first blocks, and the second time slots are grouped into second blocks. The device comprises time slot selection means, in communication with radio-frequency transmitting/receiving means, with the selection means being arranged to select by default the first time slots for transmitting/receiving the corresponding first bursts, in case of a first time slot at least partially overlapping with a second time slot, choose the first time slot or the second time slot, for respectively transmitting/receiving the first burst corresponding to this first time slot or receiving the second burst corresponding to this second time slot, the choice being made so as to cover the useful data of the second block corresponding to this second time slot, with a minimum number of second bursts received for this second block.

The selection is therefore made time slot by time slot. This avoids the loss of bursts corresponding to time slots provided substantially at the same time as time slots which in reality are superfluous due to for example the generally introduced redundancy.

Rather than refraining from transmitting/receiving all the first bursts of two PDTCH blocks for example in order to receive the second bursts of a BCCH block for example, one chooses to receive only some of the second bursts, and to transmit/receive only some of the first bursts. In other words, the granularity changes from a "block" granularity to a "burst" granularity.

The choice is made so as to cover the useful data of the second block, for example a BCCH block, with a minimum number of second bursts received for this BCCH block. In other words, only a number of second bursts necessary and sufficient to find all useful data of the block BCCH is received. If the second bursts received are sufficient to find the useful data of this BCCH block, then the receipt of additional second bursts becomes superfluous (for this block BCCH) and the transmitting/receiving of first bursts can resume.

In fact, although only some of the second bursts of a given second block are received, the useful data corresponding to the entirety of this second given block can be obtained, due to the generally introduced redundancy.

Typically, there is channel encoding and an interlacing of encoded data over several bursts, such that it is possible to recover all the data of a block transmitted/received, from only a part of the data of this block.

This redundancy therefore can reduce the number of second bursts received in a constant or substantially constant manner.

And although only some of the first bursts of a given first block are transmitted/received, the data corresponding to the entirety of this first block can be found by decoding said only some bursts transmitted/received, due to the generally introduced redundancy in radiocommunications.

In addition, as only some of the second bursts of a given second block are received, it is possible that all the bursts of one of the two first blocks overlapping in time with this second given block can be transmitted/received. Thus, the receipt of second bursts affects the transmitting/receiving of only one first block. And for this first block so affected, it is possible that the useful data corresponding to this block are found in their entirety after a partial decoding, based on some of the first bursts only.

The device can advantageously comprise a decoding means for, in the case of the first block corresponding to at least a first time slot not selected by the selection means and at least a first time slot selected by the selection means, decoding the first bursts transmitted/received during this at least one selected time slot, in order to cover all the useful data of said first block.

In other words, the decoding is done based on all the first bursts transmitted/received at times not dedicated to receiving a second burst. Thus, a partial decoding is done from all bursts it was possible to transmit/receive in spite of the receiving of one or more second burst(s).

The invention is of course not limited to such a partial decoding. One can, for example, perform the decoding using only some of the first bursts among the first bursts transmitted/received.

The selection means are advantageously arranged so as to, for a second block corresponding to at least one second time slot at least partially overlapping one first time slot:
  select a set of at least one time slot, for receiving a set of at least one respective second burst, and
  as a function of a result of analyzing the set of at least one second burst received, select at least one additional second time slot.

This therefore begins with receiving a certain number of second bursts, then making an analysis based on these second bursts received, for example a decoding or an estimation of a signal quality value. Depending on the result of the analysis, this or that time slot is selected or not selected. For example, depending on the result of the analysis:
  receiving the second burst(s) for this block is continued, one or more particular second time slot(s) are chosen for receiving the corresponding second burst(s), or
  the transmitting/receiving of first bursts is resumed.

For example, with such an early decoding process, the receiving of second bursts of a given block is performed on sufficient second bursts to achieve a desired result, for example the covering of all useful data of this given block. Once the desired result is achieved, one refrains from receiving additional second bursts for this block, so that first bursts can be transmitted/received.

The invention is in no way limited by this characteristic. For example, the selection of the second time slots can be arbitrary. As an example, one can simply receive the first two (based on time) of the second bursts of each second block, then systematically resume transmitting/receiving the first bursts.

Advantageously, in the case of early decoding, the analysis comprises a decoding of the set of second burst(s) received. Because of the redundancy, the number of burst(s) received can be sufficient to cover all useful data of the second block.

For example, the set contains exactly two second bursts. Because of the current redundancy, two second bursts can be sufficient to cover all useful data of the second block.

Alternatively, the set can comprise one, three, four, or even more second burst(s).

If the number of bursts in this set is not sufficient to cover all useful data of the second block, one can for example receive an additional second burst. The decoding can then be done again, taking into account this additional burst. The receiving of second bursts can be continued if this latest decoding is not satisfactory.

The analysis can comprise an estimation of a signal quality parameter value, for example a signal-to-noise ratio (SNR). If this value satisfies a criterion, the next second time slot corresponding to this block can be chosen judiciously. For example, a second time slot provided at the same time as an "idle" frame of a PDTCH channel could be chosen. This "idle" frame does not contain a first time slot, so receiving the second corresponding burst to the second time slot chosen does not interfere with the PDTCH communications. For example, a second time slot overlapping first time slots corresponding to a first block other than the block already affected by receiving the set of second bursts can be chosen, to avoid too much interference with the transmitting/receiving of a same first data block.

In fact, if this quality criterion is satisfied, it is estimated that, for example, one additional burst is sufficient to cover the useful data of the second block. This burst can then be chosen so as to interfere as little as possible with the packet communications.

If the value of the estimated signal quality parameter does not satisfy the criterion, then receiving of second bursts can continue.

The set can then contain a single second burst, because it is generally possible to at least roughly estimate a signal quality parameter value based on a single second burst. Of course, a higher number can be used.

Advantageously, in case of a second block corresponding to at least one second time slot at least partially overlapping at least one first time slot corresponding to at least one first block, the moments of overlap between the second block and the at least one first block are taken into account. For example, if the start of a BCCH block is scheduled during the first half of a PDTCH block, BCCH bursts can be received at the start of the BCCH block and the BCCH bursts at the end of this BCCH block can be ignored, in order to transmit/receive the PDTCH bursts, and if the BCCH block is to start during the second half of a PDTCH block, one or more BCCH burst(s) can be ignored in order to transmit/receive on the packet channels during this time and receive the next BCCH bursts of this BCCH block, or the inverse.

The invention is in no way limited by this characteristic. For example, it can be arranged to always receive the second burst corresponding to the time slot closest to the start of the corresponding second block.

The radiocommunication management device can include radio-frequency transmitting/receiving means, or can be separate from these means.

The radiocommunication management device can include means for analyzing received bursts, or be separate from these analysis means. These analysis means, for example an analog and/or digital circuit, can enable the decoding of bursts received, or the estimation of the signal quality parameter value.

The radiocommunication management device can include means for conditioning the signals to be transmitted/received, or can be separate from these conditioning means. These conditioning means, for example an analog and/or digital circuit, can allow converting digital data into signals to be transmitted by the radio-frequency transmitting means, and converting the signals received from the radio-frequency receiving means into digital data.

The radiocommunication management device can include synchronization means, or can be separate from these means. These synchronization means, for example an analog and/or digital circuit, allow scheduling the first and second time slots, by determining the start and end times for these time slots.

The radiocommunication management device can comprise a microcontroller, a processor, or other component for a mobile terminal or a mobile communications server.

Also proposed is a process for managing mobile telephony radiocommunications, with first time slots being provided for transmitting/receiving respective first bursts, and second time slots being provided independently of the first time slots, for receiving respective second bursts. The first bursts are grouped into first blocks and the second bursts are grouped into second blocks. The first time slots are selected by default for transmitting/receiving corresponding first bursts. In case of a first time slot at least partially overlapping with a second time slot, the first slot or the second slot is chosen, for respectively transmitting/receiving the first burst corresponding to this first time slot or receiving the second burst corresponding to this second time slot, the choice being made so as to cover the useful data of the second block corresponding to this second time slot with a minimum number of second bursts received for this second block.

This process can be implemented in the device described above.

The first bursts can comprise packet data, or other data.

The second bursts can comprise control data, signaling data, system information data, or other data, for example BCCH, PCH, PBCCH (Packet Broadcast Control Channel), PPCH (Packet Paging Channel), etc.

The invention has applications for example in the fields of GSM, GPRS, and 3GPP telephony.

Additionally proposed is a computer program comprising instructions for implementing the process described above when it is loaded into the memory of a processor and executed by this processor.

Other features and advantages of the invention will be apparent from reading the following description.

The same references in different figures may be used to represent identical or similar objects.

DETAILED DESCRIPTION

Figure 1:
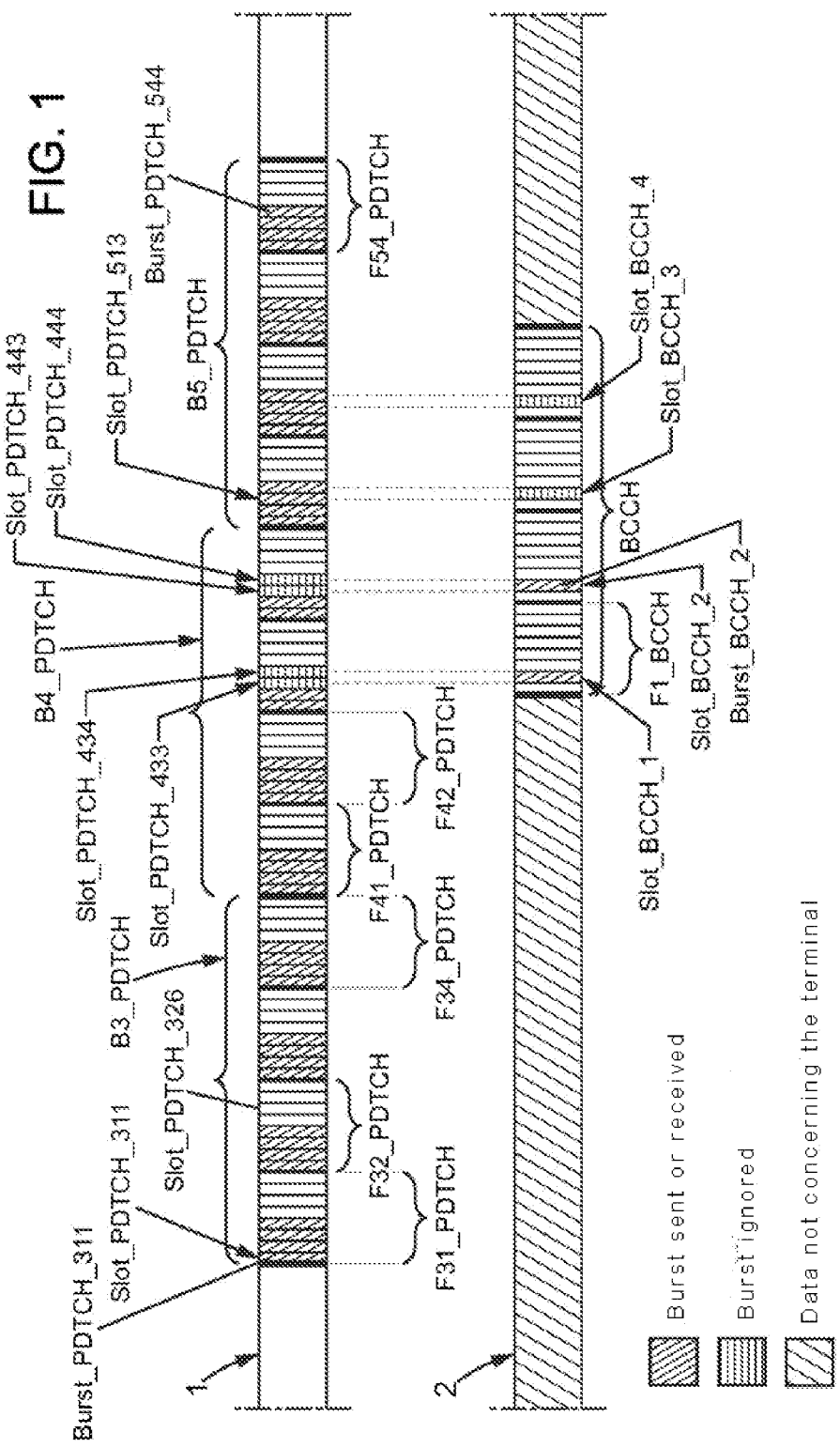
FIG. 1 shows timing charts illustrating a process according to an embodiment of the invention.

With reference to FIG. 1, the timing charts 1, 2 show the structures of data transmitted or received in TDMA mobile telephony.

The timing chart 1 corresponds to packet channels, in which first slots Slot_PDTCH_311, . . . Slot_PDTCH_548, are set aside. Some of these first slots, called "first time slots", are allocated for transmitting/receiving first bursts Burst_PDTCH_311, . . . Burst_PDTCH_544, between a radiocommunication device and another device of a same cell, called the current cell. The timing chart 2 corresponds to a supplemental channel, here a BCCH channel. Second signals corresponding to this BCCH channel come from a cell neighboring the current cell. Most of the data corresponding to this channel (represented as diagonal hatching) do not concern the radiocommunications device and therefore are ignored by this device. A BCCH block of data intended for the radiocommunication device is represented in FIG. 1.

This device comprises a synchronization means for scheduling the start and end times of second time slots Slot_BCCH_1, . . . , Slot_BCCH_4, independently of the start and end times of the first time slots Slot_PDTCH_311, . . . Slot_PDTCH_544. These second time slots Slot_BCCH_1, . . . , Slot_BCCH_4 are allocated in order for the radiocommunications device to receive the bursts Burst_BCCH_1, . . . , Burst_BCCH_4 of the BCCH block.

The packet data are also organized into blocks. The data of each block are divided into a number of time slots, four in this case.

For example, the bursts Burst_PDTCH_311, Burst_PDTCH_321, Burst_PDTCH_331, Burst_PDTCH_341 form a block, while the bursts Burst_PDTCH_312, Burst_PDTCH_322, Burst_PDTCH_332, Burst_PDTCH_342 form another block. As a block thus corresponds to a single logical channel, each reference B3_PDTCH, B4_PDTCH, B5_PDTCH corresponds to a number of logical channels, four logical channels in this example, and therefore to four blocks. For convenience we will call a "block" all the data actually corresponding to four logical channels and therefore to four blocks.

The blocks BCCH, B3_PDTCH, B4_PDTCH, B5_PDTCH, are divided into frames, in this example four frames F1_BCCH, . . . , F4_BCCH, F31_PDTCH, . . . , F54_PDTCH. Each frame contains eight slots, some of them allocated for transmitting/receiving bursts. For each frame F1_BCCH, . . . , F4_BCCH, only one Slot_BCCH_1, . . . , Slot_BCCH_4 of the eight slots is allocated for receiving a second burst, with the seven other slots considered to be empty or not useful (empty slot or non-allocated slot). For each frame F31_PDTCH, . . . , F54_PDTCH, the first four slots Slot_PDTCH_311, . . . Slot_PDTCH_314, . . . , Slot_PDTCH_541, . . . Slot_PDTCH_544 are allocated for transmitting or receiving first bursts. The four last slots Slot_PDTCH_315, . . . Slot_PDTCH_318, . . . , Slot_PDTCH_545, . . . Slot_PDTCH_548 of each frame F31_PDTCH, . . . , F54_PDTCH, are considered to be empty or not useful.

Each time slot corresponds to a single burst.

For each PDTCH frame, each of the four first time slots Slot_PDTCH_311, . . . Slot_PDTCH_314, . . . , Slot_PDTCH_541, . . . Slot_PDTCH_544 allocated for transmitting or receiving bursts corresponds to a particular logical channel.

The start time of the BCCH block does not necessarily correspond to empty space in the logical PDTCH channels. In addition, the second time slots Slot_BCCH_1, . . . , Slot_BCCH_4 allocated for receiving second bursts are not necessarily aligned with the first time slots Slot_PDTCH_311, . . . Slot_PDTCH_314, . . . , Slot_PDTCH_541, . . . Slot_PDTCH_544 allocated for transmitting or receiving first bursts.

If the second time slots Slot_BCCH_1, . . . , Slot_BCCH_4 overlap slots considered to be empty Slot_PDTCH_315, . . . Slot_PDTCH_318, . . . , Slot_PDTCH_545, . . . Slot_PDTCH_548 (case not represented in FIG. 1), then the second bursts corresponding to these second time slots Slot_BCCH_1, . . . , Slot_BCCH_4 can be received without causing a loss of packet signals.

FIG. 1 shows another case, in which the second time slots Slot_BCCH_1, . . . , Slot_BCCH_4 partially overlap first time slots Slot_PDTCH_433, Slot_PDTCH_434, Slot_PDTCH_443, Slot_PDTCH_444, Slot_PDTCH_513, Slot_PDTCH_514, Slot_PDTCH_523, Slot_PDTCH_524. For example, the second time slot Slot_BCCH_1 has a start time during the first time slot Slot_PDTCH_433, and an end time during the first time slot Slot_PDTCH_434.

A choice is made between the second time slot Slot_BCCH_1 and the two first time slots Slot_PDTCH_433, Slot_PDTCH_434.

For example, the first bursts of the first time slots Slot_PDTCH_433, Slot_PDTCH_434, Slot_PDTCH_443, Slot_PDTCH_444 are ignored (horizontal hatching), so that the second bursts of the second time slots Slot_BCCH_1, Slot_BCCH_2 can be received.

These two received bursts are decoded, according to processes well known to a person skilled in the art and familiar with TDMA mobile telephony.

If this decoding results in obtaining the set of useful data of the BCCH block (successful decoding), the bursts of the following second time slots Slot_BCCH_3, Slot_BCCH_4 can be ignored, in order to allow transmitting/receiving bursts of all the following first time slots, including the time slots Slot_PDTCH_513, Slot_PDTCH_514, Slot_PDTCH_523, Slot_PDTCH_524 partially overlapped by these following second time slots Slot_BCCH_3, Slot_BCCH_4, as represented in FIG. 1.

If the decoding does not lead to covering all the useful data of the BCCH block (case not represented in FIG. 1), the process begins listening for the second burst of the next second time slot Slot_BCCH_3. The first time slots Slot_PDTCH_513, Slot_PDTCH_514 are therefore not selected.

A decoding is then done based on the second bursts received during these three second time slots Slot_BCCH_1, Slot_BCCH_2 Slot_BCCH_3. If this decoding leads to obtaining all the useful data of the BCCH block, the burst of the next second time slot Slot_BCCH_4 can be ignored, in order to allow transmitting/receiving bursts of the time slots Slot_PDTCH_523, Slot_PDTCH_524 partially overlapped by this next second time slot Slot_BCCH_4. If this second decoding does not lead to covering all the data of the BCCH block, then the burst of the time slot Slot_BCCH_4 is received, ensuring access to all the useful data of the BCCH block.

In this manner, from two to four second time slots are selected Slot_BCCH_1, Slot_BCCH_2, Slot_BCCH_3, Slot_BCCH_4, meaning that the number of bursts lost in the PDTCH channels is between four and eight.

In the example in FIG. 1, the two second time slots Slot_BCCH_1, Slot_BCCH_2 cover the first time slots of the last two frames F43_PDTCH, F44_PDTCH of the block B4_PDTCH.

For each of these two last frames F43_PDTCH, F44_PDTCH, the bursts of two channels (called channels 1 and 2) are transmitted/received normally, during the first time slots Slot_PDTCH_431, Slot_PDTCH_432, Slot_PDTCH_441, Slot_PDTCH_442, and the bursts of the two other channels (called channels 3 and 4) are ignored due to the selection of the second time slots Slot_BCCH_1, Slot_BCCH_2.

For each of these two other channels 3 and 4, only two of the four bursts forming the block corresponding to this channel are transmitted/received, and a decoding is done from these only two bursts. Due to the redundancy introduced, there is a good chance of recovering all the useful data of these blocks corresponding to the channels 3 and 4.

The decoding is done by the radiocommunication device, in particular in the case of the first bursts received. In the case of the first bursts transmitted, the decoding can be done by a remote device, for example a remote terminal or a remote base station.

Concerning the block B5_PDTCH, note that for each of the channels 3 and 4, between two and four first bursts are transmitted/received. If less than four first bursts are received, a partial decoding is done based on the first bursts transmitted/received.

In the example in FIG. 1, all the first bursts of the block B5_PDTCH are transmitted/received.

Alternatively, one could ignore the second burst of the second time slot Slot_BCCH_1, in order to guarantee the transmitting/receiving of three first bursts for each logical channel for the block B4_PDTCH. Thus, two second bursts Burst_BCCH2, Burst_BCCH3 are sufficient for obtaining all the useful data of the BCCH block; three first bursts will have also been transmitted/received for each logical channel for the block B5_PDTCH. This increases the chances of covering all the useful data of the blocks B4_PDTCH, B5_PDTCH.

Figure 2:
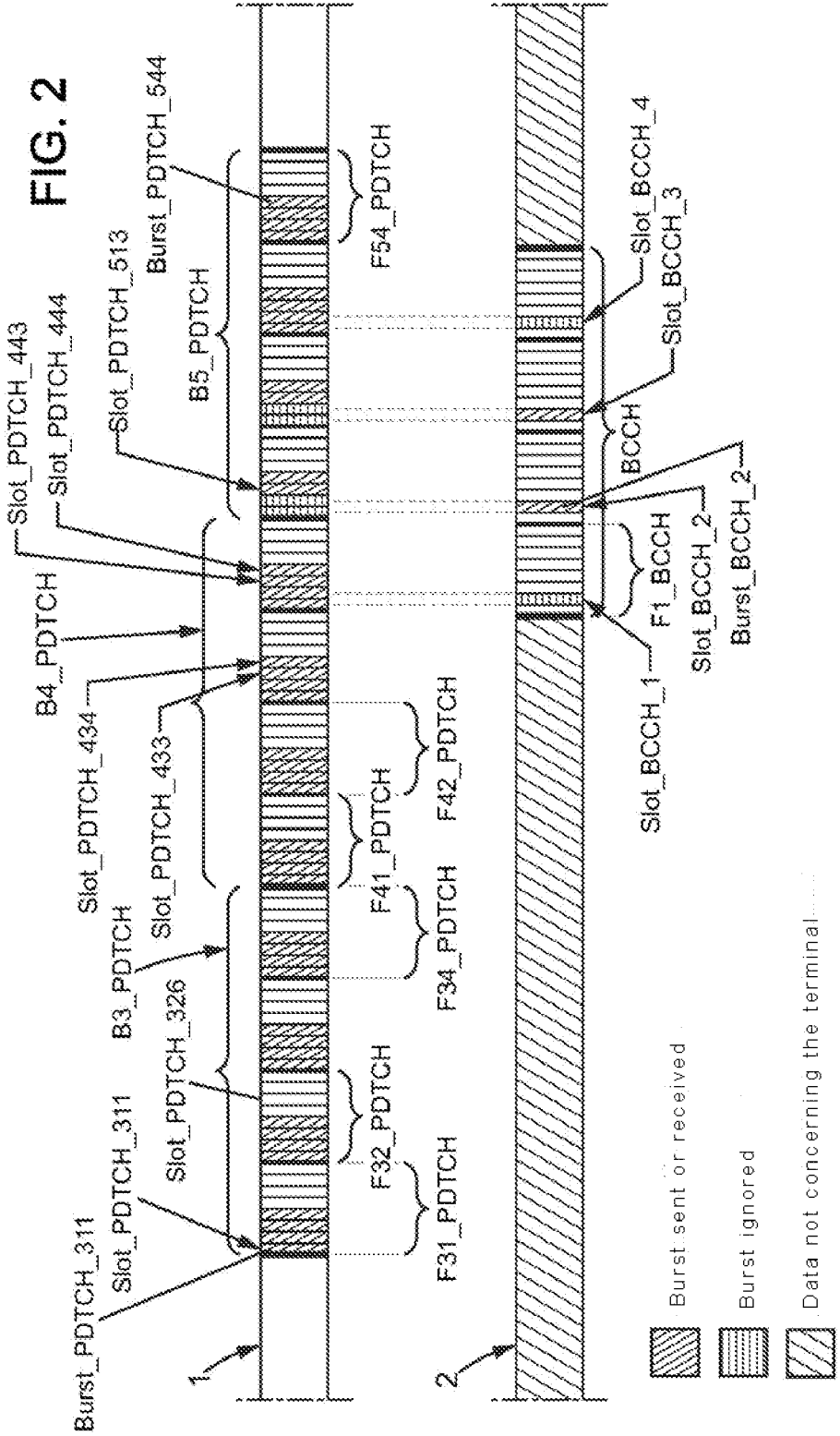
FIG. 2 shows timing charts illustrating a process according to an embodiment of the invention.

FIG. 2 shows another case, in which, as the start of the BCCH block corresponds to the second half of the block B4_PDTCH, the burst of the second time slot Slot_BCCH_1 is ignored, allowing the transmitting/receiving of all the first bursts of the block B4_PDTCH. A decoding is done based on the second burst received during the time slots Slot_BCCH_2, Slot_BCCH_3, and if this decoding is satisfactory, the burst of the second time slot Slot_BCCH_4 can be ignored. Otherwise (not represented in FIG. 2), the burst of the time slot Slot_BCCH_4 is received and the bursts of the first time slots Slot_PDTCH_531, Slot_PDTCH_532 are ignored.

Figure 3:
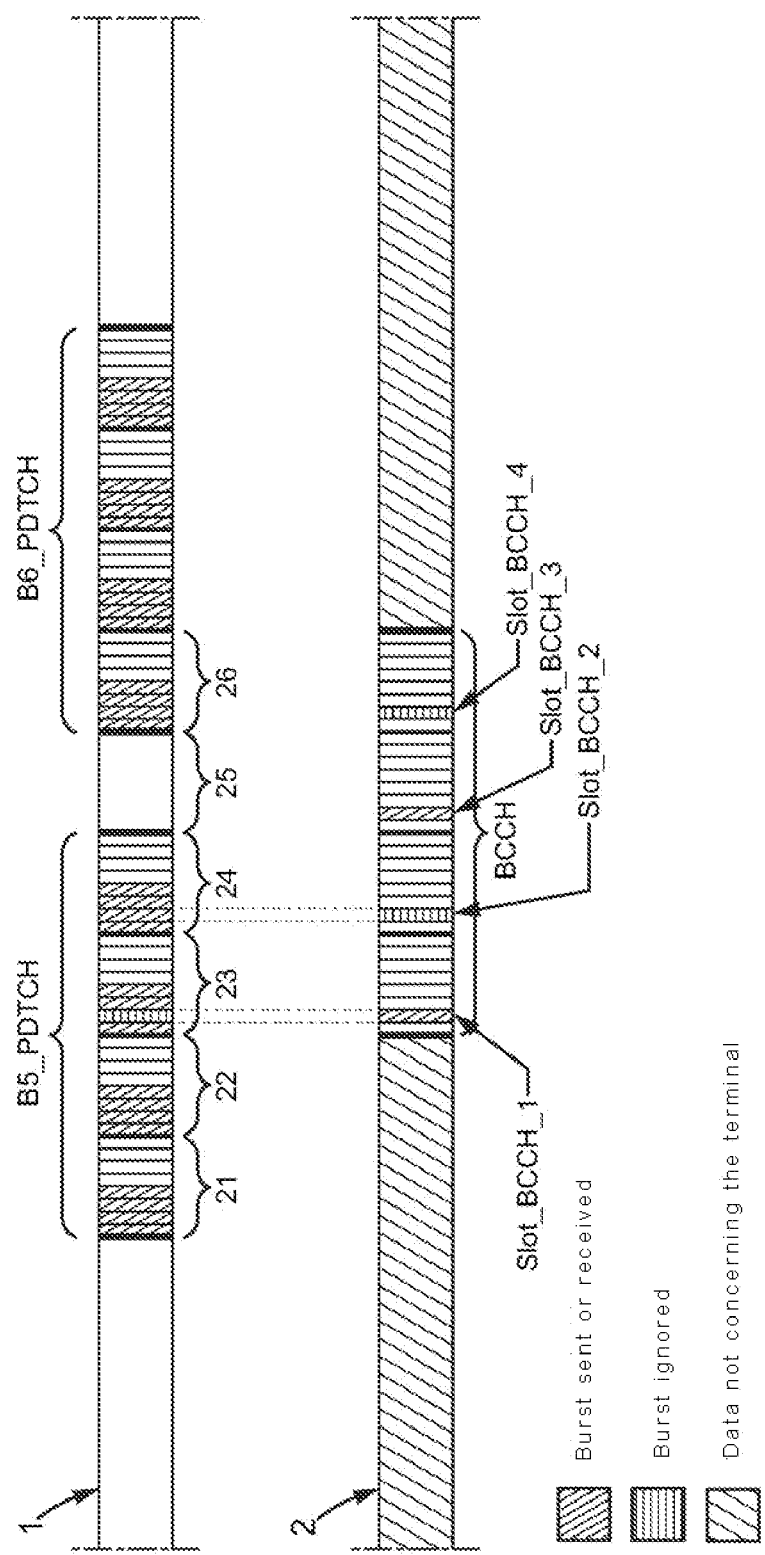
FIG. 3 shows timing charts illustrating a process according to an embodiment of the invention.

FIG. 3 illustrates another embodiment, in which the burst corresponding to the second time slot Slot_BCCH_1 is received. The signals received are demodulated and a signal quality parameter value is estimated based on the demodulated signals. If this value exceeds a threshold, the transmission is considered to be of sufficiently good quality for all the useful data of the BCCH block to be found with only one additional second burst.

It is therefore possible to choose judiciously the second time slot corresponding to this additional burst. For example, the time slot Slot_BCCH_3 is selected, because this time slot is scheduled during an idle PDTCH frame 25.

If the estimated value of the signal quality parameter is less than the threshold (case not represented in FIG. 3), then the burst of the next time slot Slot_BCCH_2 is received. A decoding is done based on two bursts so received, and if the decoding is not satisfactory, a third, or even a fourth burst is (are) received during the time slot Slot_BCCH_4.

In this example, each second time slot exactly covers one first time slot, and not two as in the examples in FIGS. 1 and 2.

One will note that a BCCH block may cover the time period allocated for receiving PTCCH (Packet Timing Control Channel) data. These PTCCH data may therefore be lost. Even so, as these data are transmitted repeatedly, typically every 26 frames, decoding can be done from PTCCH data received at other times.

Figure 4:
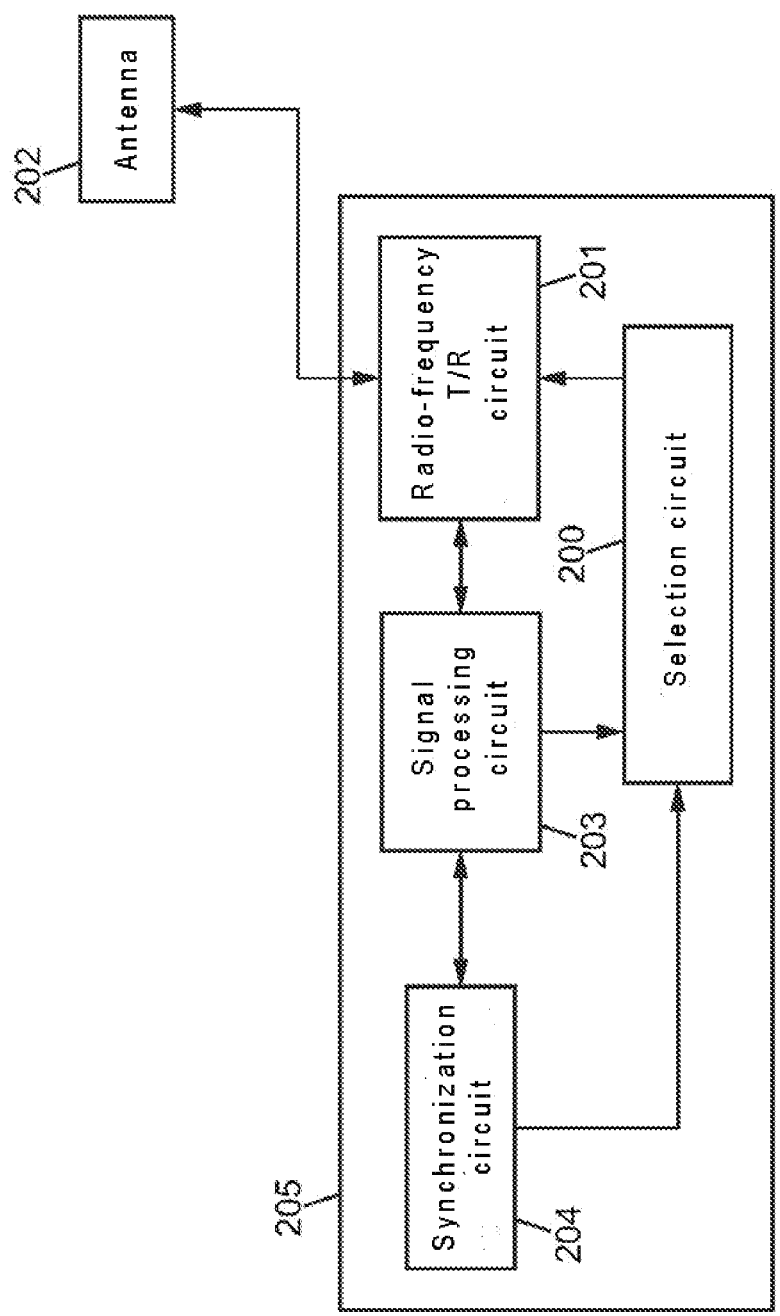
FIG. 4 shows an example of a device according to an embodiment of the invention.

FIG. 4 shows an example of a mobile telephony device, for example a terminal or a server. This device comprises a radiocommunication management device 205, for example an analog and digital circuit, and an antenna 202.

A radio-frequency transmitting/receiving circuit 201 allows choosing the frequency bands for transmitting/receiving. This circuit 201 can comprise a tuner, adjustable frequency filters, or other means well known to a person skilled in the art.

A signal processing circuit 203 integrates a means of conditioning the signals to be transmitted/received, and means of analyzing received signals.

A synchronization circuit 204 sends indications of time slot start and end times to this signal processing circuit.

A selection circuit 200 in communication with this circuit 204 allows choosing the time slots for transmitting or receiving bursts, particularly when several time slots overlap. As described above, in case of overlap, certain first time slots are not selected and certain second time slots are not selected by the circuit 200. The selection circuit 200 thus makes a choice of time slot(s) and imposes on the radio-frequency transmitting/receiving circuit the frequency bands for transmitting/receiving radio-frequency signals. As a result, certain bursts of one (or more) PDTCH block(s) are not transmitted/received, and certain bursts of a BCCH block are not received.

This selection circuit 200 can be connected to the processing circuit 203. In fact, in case of partial decoding, the processing circuit can transmit an indication of the success or failure in decoding in order to ensure that the data from the block of second signals are covered. This indication can be a value of a Boolean variable, an error rate, or some other value. Depending on the value received, the receiving of BCCH bursts is continued or not continued.

The invention claimed is:

1. A mobile telephony radiocommunication management process, with first time slots being provided for transmitting or receiving respective first bursts and second time slots being provided independently of the first time slots, the second time slots configured to receive respective second bursts, the first bursts being grouped into first blocks and the second bursts being grouped into second blocks, the process comprising:
   selecting by default first time slots configured for transmitting or receiving the first bursts;
   when a first time slot in a second half of a block of the first blocks, at least partially overlaps with a second time slot having a start time in a first half of a block of the second blocks, choosing one of either the first time slot or the second time slot for respectively transmitting or receiving at least one of the first bursts corresponding to the first time slot or receiving at least one of the second bursts corresponding to the second time slot, the choice being made so as to receive partially received redundant data or completely received redundant data of a next block after the block of the second blocks corresponding to the second time slot within a minimum number of second bursts received during the next block;
   when the first time slot is chosen, transmitting or receiving at least one of the first bursts corresponding to the first time slot; and
   when the second time slot is chosen, receiving at least one of the second bursts corresponding to the second time slot.

2. A mobile telephony radiocommunication management device comprising:
   a radio-frequency transmit and receive circuit configured to transmit or receive first time slots, the first time slots being configured for transmitting or receiving respective first bursts, the radio-frequency transmit and receive circuit being further configured to receive second time slots that are independent of the first time slots, the second time slots are configured to receive respective second bursts, the first bursts being grouped into first blocks and the second bursts being grouped into second blocks;
   a time slot selection circuit in communication with the radio-frequency transmitting and receiving circuit, the time slot selection circuit being configured to select by default the first time slots for transmitting or receiving the first bursts;
   wherein when a first time slot in a second half of a block of the first blocks, at least partially overlaps with a second time slot having a start time in a first half of a block of the second blocks, the time slot selection circuit is configured to select one of either the first time slot or the second time slot, for respectively transmitting or receiving at least one of the first bursts corresponding to said first time slot or receiving at least one of the second bursts corresponding to the second time slot, the choice being made so as to receive partially received redundant data or completely received redundant data of a next block after the block of the second blocks corresponding to the second time slot within a minimum number of second bursts received during the next block;
   a decoding circuit configured to decode the first bursts transmitted or received during the at least one selected first time slot, for the purposes of obtaining all data of the block of the first blocks wherein the block of the first blocks corresponds to at least one first time slot not selected by the selection circuit and to at least one first time slot selected by said selection circuit, wherein the not selected and the selected at least one first time slots comprise redundant data.

3. A device according to claim 2 wherein for the block of the second blocks corresponding to at least one second time slot at least partially overlapping at least one first time slot, the time slot selection circuit is configured to:
   select a set of at least one second time slot from the block of the second blocks, for the receiving of a set of at least one respective second burst; and
   analyze the set of at least respective one second burst received in order to select at least one additional second time slot from the block of the second blocks.

4. A device according to claim 3, wherein the analysis of the set of at least one respective second burst received is configured to indicate a success or failure of a decoding performed based on a set of at least additional one second burst received respective to the at least one additional second time slot.

5. A device according to claim 3, wherein the analysis of the set of at least one respective second burst received is configured to provide a signal quality parameter value estimated on the basis of the set of at least one respective second burst received.

6. A device according to claim 2, wherein the time slot selection circuit is configured to take into account the times of overlap between the block of the second blocks with the block and a next block after the block of the first blocks, wherein the block of the second blocks corresponds to at least one second time slot that at least partially overlaps at least one first time slot that corresponds with the block or the next block of the first blocks.

7. A device according to claim 2, further comprising at least one of:
- a signal processing circuit in electrical communication with the radio frequency transmit and receive circuit and the selection circuit, the signal processing circuit configured to analyze the first and second bursts received;
- a signal conditioning circuit configured to condition signals to be transmitted or received, the signal conditioning circuit being in electrical communication with the radio-frequency transmit and receive circuit;
- a synchronization circuit configured to provide the first time slots and the second time slots to at least the time slot selection circuit.

8. A device according to claim 2, wherein the device operates using time distributed multiple access (TDMA).

* * * * *